(12) United States Patent
Hauzenberger et al.

(10) Patent No.: US 8,221,674 B2
(45) Date of Patent: Jul. 17, 2012

(54) DISTRIBUTOR BASE

(75) Inventors: Franz Hauzenberger, Linz (AT); Karl Zehetbauer, Feldkirchen (AT); Jun Hyuk Lee, Gyeongbuk (KR); Myoung Kyun Shin, Gyeongbuk (KR); Won Namkung, Gyeongbuk (KR); Minyoung Cho, Guyeongbuk (KR); Sun-Kwang Jeong, Gyeongbuk (KR); Nag Joon Choi, Busan (KR); Hang Goo Kim, Gyeongbuk (KR)

(73) Assignee: Siemens Vai Metals Technologies GmbH (AT)

( * ) Notice: Subject to any disclaimer, the term of this patent is extended or adjusted under 35 U.S.C. 154(b) by 823 days.

(21) Appl. No.: 12/158,826

(22) PCT Filed: Dec. 20, 2006

(86) PCT No.: PCT/EP2006/012292
§ 371 (c)(1),
(2), (4) Date: Sep. 3, 2008

(87) PCT Pub. No.: WO2007/079939
PCT Pub. Date: Jul. 19, 2007

(65) Prior Publication Data
US 2009/0039573 A1 Feb. 12, 2009

(30) Foreign Application Priority Data
Dec. 23, 2005 (AT) .............................. A 2068/2005
Dec. 26, 2005 (KR) ..................... 10-2005-0130071

(51) Int. Cl.
*B01J 8/24* (2006.01)

(52) U.S. Cl. ........................................ 266/172; 422/143
(58) Field of Classification Search ................. 266/172; 422/143, 311
See application file for complete search history.

(56) References Cited

U.S. PATENT DOCUMENTS

| 3,746,516 | A | * | 7/1973 | Michaud | ........................ 422/311 |
| 3,982,900 | A | | 9/1976 | Malgarini et al. | |
| 5,753,191 | A | * | 5/1998 | Yamamoto et al. | ........... 422/143 |

FOREIGN PATENT DOCUMENTS

| EP | 0 721 798 A2 | 7/1996 |
| GB | 2 271 727 A | 4/1994 |
| WO | WO 98/55218 | 12/1998 |
| WO | WO 2005/087361 A | 9/2005 |
| WO | WO2005/108628 A1 * | 11/2005 |

OTHER PUBLICATIONS

International Search Report dated Mar. 26, 2007, issued in corresponding PCT Application No. PCT/EP2006/012292.

* cited by examiner

*Primary Examiner* — Scott Kastler
(74) *Attorney, Agent, or Firm* — Ostrolenk Faber LLP

(57) ABSTRACT

A distributor bottom, particularly a nozzle-type distributor bottom, for steadily introducing process gas, especially process gas loaded with solid particles, into a process chamber, optionally to create a fluidized bed. The process chamber is disposed above the distributor bottom and is formed by walls of a reactor used for metallurgically, particularly thermally, treating feedstock. The distributor bottom is provided with a plurality of holes. Holes are arranged near the walls to prevent substances from attaching to the reactor walls. Special arrangements relate to nozzles and ducts.

29 Claims, 5 Drawing Sheets

DISTRIBUTOR BASE

CROSS REFERENCE TO RELATED APPLICATION

The present application is a 35 U.S.C. §§371 national phase conversion of PCT/EP2006/012292, filed 20 Dec. 2006, which claims priority of Austrian Application No. A2068/05, filed Dec. 23, 2005 and Korean Application No. 2005-0130071, filed Dec. 26, 2005, the disclosures of which have been incorporated herein by reference. The PCT International Application was published in the German language.

The invention relates to a distributor base, in particular a nozzle distributor base, for uniformly introducing process gas, in particular laden with solid particles, possibly to form a fluidized bed, into a process chamber which is arranged above the distributor base and is formed by reactor walls of a reactor for the metallurgical, in particular thermal, treatment of feedstock, the distributor base having a multiplicity of openings.

Distributor bases serve for the controlled introduction or distribution of a process gas into a reactor. Reactors of this type operate for example on the fluidized bed principle, a stream of process gas keeping the material that is to be processed in the reactor, usually material in piece form, in a fluidized bed.

It is known from the prior art to use distributor bases to ensure the distribution of the process gas in a reactor.

A fundamental problem with operating reactors of this type is that of deposits on the reactor walls or else in the region of the distributor base itself. These may be caused by the presence of zones with insufficient fluidization, so that the solid material, if it has a tendency to cake, may form solid agglomerates at these locations, which is also known as sticking. These effects on the one hand reduce the useful volume of the reactor, and on the other hand may cause internal components to be adversely affected in their function or even completely deprived of their function, as for example in the case of heat exchange tubes, the heat transmission of which may be massively reduced.

WO 98/55218 discloses a device for improving the gas flow in a fluidized bed unit. However, a disadvantage of that device is that deposits, in particular in the region of the reactor vessel, cannot be reliably avoided by the distributor base that is shown.

SUMMARY OF THE INVENTION

On the basis of the prior art, an object of the invention is to overcome the disadvantages of the prior art and to provide a distributor base which largely avoids sticking in the entire reactor chamber.

The object of the invention is achieved with the invention.

Sticking represents a problem in particular in regions of low flow velocity in the reactor, since here there is only little fluidization and therefore little momentum available for breaking up bridges of solid material to solid material. The instances of caking often occur on the reactor walls in the region of the distributor base. The distributor base according to the invention has the effect that the near-wall openings are arranged at such a distance from the reactor walls that their center distance is in each case at most 1 to 10 times, in particular 2 times, the diameter of the opening. Near-wall is understood here as meaning a range of approximately 5 to 20% of the diameter, measured from the outer edge.

In comparison with the prior art, the openings are therefore positioned much closer to the reactor walls. It is consequently ensured that a sufficiently great flow velocity, and consequently an adequate process gas flow, is present also in the region of the reactor walls, so that instances of caking are avoided. Arrangement of the near-wall openings as close as possible to the reactor walls avoids the formation of near-wall layers of flow with low flow velocities, which in turn would lead to deposits of a material that is being processed in the reactor in piece form or in the form of fine particles. By adapting the distance according to the diameter of the opening, the flow situation can be correspondingly influenced or adapted.

A special embodiment of the distributor base according to the invention provides that the ratio of the distance between the center axis of a near-wall opening and the center axis of the distributor base in relation to the radius of the distributor base is 0.9-1. This special configuration allows an advantageous through-flow, and consequently formation of a fluidized bed.

A particular embodiment of the distributor base according to the invention provides that the near-wall openings are arranged circularly in 1 to 5 circles, in particular 3 circles. The special form of the arrangement allows an advantageous through-flow, or the entry of process gas into the reactor, in particular in reactors with round cross sections. This allows near-wall regions of the distributor base without openings to be avoided and regions with a tendency toward caking to be excluded. The openings of each circle may be arranged correspondingly at equal distances from the wall. The angular position of the openings in each of the circles may be varied in a way corresponding to the needs for adaptation of the flow situation. However, it is also conceivable to fix the openings in the circles in such a way that the openings are respectively arranged on radially directed lines.

Furthermore, it is conceivable to provide this arrangement of the openings also for reactors which do not have a round cross section but for example a polygonal cross section. Adapting the arrangement of the openings to the cross-sectional situation also allows deposits in corners to be reliably avoided.

A special embodiment of the distributor base according to the invention provides that the near-wall openings are arranged in 1 to 5 rows, in particular in 2 rows, parallel to an inner reactor wall. This configuration is used in particular in the case of reactors with polygonal cross sections for example. The arrangement according to the invention allows the flow conditions to be advantageously adapted.

According to an advantageous embodiment of the distributor base according to the invention, at least one of the near-wall openings is arranged in line with at least one of the reactor walls. The near-wall openings are arranged in such a way that the axis of the opening is aligned with the closest reactor wall, that is to say that the axis of the opening is at least parallel to the wall. This arrangement in conjunction with a small distance between the opening and the reactor wall achieves the effect that the reactor wall is subjected to very good flow. Instances of caking can be avoided in this way.

One particular embodiment of the distributor base according to the invention provides that at least one of the near-wall openings forms an angle of ±15°, preferably ±5°, with at least one of the reactor walls. This arrangement allows flows to be directed in relation to at least one of the walls and instances of caking to be prevented in a targeted manner.

An advantageous configuration of the distributor base according to the invention provides that the openings are at least partly arranged on circles, the openings of at least two circles being arranged offset in relation to one another in the circumferential direction, in particular in such a way that the openings of a circle that is next in the inward direction are arranged between the openings of the outer circle. The radial distribution of the openings allows even more uniform distribution of the process gas to be achieved.

One possible embodiment of the distributor base according to the invention provides that the number of near-wall openings per unit area at the edge region of the distributor base is greater than the number of openings away from the wall per unit area at the region away from the walls of the distributor base. The greater number of openings in the region of the reactor walls makes it possible to influence the flow situation in such a way that instances of caking can be effectively avoided. In particular, instances of caking in critical regions of a reactor, such as for example in corners, can be correspondingly avoided by the locally greater number of openings, and the local flow situation can be improved.

A further possible embodiment of the distributor base according to the invention provides that the near-wall openings have a greater diameter, preferably a diameter greater by 10 to 50%, in particular 20%, in relation to the openings away from the wall, so that more process gas can be introduced in the near-wall regions. Apart from an adaptation of the flow by way of the number of openings, an adaptation by way of the diameter is also possible, so that the flow situation in the reactor can be influenced or adapted even better.

According to a special embodiment of the distributor base according to the invention, at least one of the near-wall openings is arranged parallel to one of the reactor walls and/or inclined at an angle of ±15°, preferably ±5°, in relation to the normal to the distributor base. The openings may be tilted with respect to the normal to the distributor base for the introduction of a targeted flow that is inclined with respect to the main direction of flow of the process gas. Once again, this measure has the effect of setting a targeted near-wall flow, and consequently of preventing instances of caking. In a special configuration, the inclination is aligned in the radial direction, so that the openings can be directed toward at least one of the walls or away from it.

The opening diameter, the gas pressure and the spatial position of the process gas jet that forms when the gas leaves the openings can be fixed in a way corresponding to the process situation. The additional flow component in the transverse direction allows the flow to be influenced or optimized even more flexibly.

A particularly advantageous embodiment of the distributor base according to the invention provides that at least one of the near-wall openings is aligned in relation to the reactor wall in such a way that the reactor wall is hit by the process gas jet formed at the opening with the calculated jet penetration depth. Jet penetration depth is understood by a person skilled in the art as meaning the depth of penetration of the permanent gas space of the jet that spreads out from a nozzle. This definition by Knowlton and Hirsan from 1980 can be taken from a number of publications, such as for example "The effect of pressure on jet penetration in semi-cylindrical gas-fluidized beds".

This brings about increased turbulence, which is of advantage for metallurgical processes.

In a way corresponding to an alternative advantageous embodiment of the distributor base according to the invention, at least one of the near-wall openings is aligned in relation to the reactor wall in such a way that the reactor wall is hit by the process gas jet formed at the opening with 70-130%, preferably 90-110%, of the calculated jet penetration depth. It has been shown by operational tests that an optimum operating state is achieved with this specific process control. According to a suitable embodiment of the distributor base according to the invention, the near-wall openings are aligned differently than the openings away from the wall. On account of the dissimilar alignment of openings near the wall and openings away from the wall, the influence of the reactor walls on the flow situation occurring can be influenced in a targeted manner. In particular, it allows special flow situations to be set, so that reactors can even be subsequently improved or optimized by an adapted distributor base if instances of caking occur. One possible arrangement of the openings could provide an alignment toward the reactor walls for the near-wall openings, while the nozzles away from the wall may be aligned such that they are normal to the distributor base.

An advantageous configuration of the distributor base according to the invention provides that at least one of the openings has a nozzle which can be set in its position. The installation of a nozzle makes it possible to set the flow situation at the opening in an even more targeted manner. The formation of a nozzle allows the flow at the nozzle, and consequently the jet formed at the nozzle, to be fixed independently of the distributor base itself. In addition, the nozzle may be produced from a different material than the distributor base, and consequently made less costly and adapted to the process. By setting the position of the nozzle, that is the axis of the nozzle, in relation to the distributor base, the flow situation can be set in a targeted manner, it being possible for the flow at the reactor walls to be fixed in an even more targeted manner and instances of caking in the region of the nozzle and guide tube to be avoided.

A special embodiment of the distributor base according to the invention provides that the nozzle which can be set in its position comprises a guide tube, the inside diameter of the guide tube being 1 to 10 times, preferably 2 to 7 times, the smallest nozzle diameter. The guide tube has the effect of stabilizing the flow approaching the nozzle, and consequently achieving a further improvement. On account of the large dimensioning of the guide tube in comparison with the nozzle, very good approaching flow and undisturbed flow at the nozzle can be ensured.

In the case of thick distributor bases, the use of a guide tube allows the region with high velocities to be restricted to a relatively small region by using a short nozzle. Instances of caking can be avoided in this way. When servicing the distributor base, such as for example when changing the nozzle, this work is not performed directly on the distributor base but on the guide tube, so that a longer service life can be reliably achieved for the distributor base.

An alternative special embodiment of the distributor base according to the invention provides that the length of the guide tube corresponds to at least 70% of the thickness of the distributor base. The length of the guide tube can be adapted to the structural conditions, such as for example the construction of the distributor base, and possibly its supporting construction, so that the desired flow situation can be set.

According to an advantageous embodiment of the distributor base according to the invention, the guide tube consists of refractory material, so that long service lives can be achieved even in the case of processes with high thermal loading.

In a way corresponding to a special embodiment of the distributor base according to the invention, the nozzle axis is arranged such that it is inclined in relation to the axis of the guide tube and/or the opening in the distributor base. This arrangement allows for example a straight approaching flow by the process gas into the guide tube. The inclination of the nozzle axis in relation to the axis of the guide tube allows the flows at the respective nozzles, and consequently the positions of the process gas jets, to be advantageously adapted. Any flow patterns can be set in this way.

In a way corresponding to an alternative special embodiment of the distributor base according to the invention, the guide tube has a bend. This design allows the insertion of a nozzle into the first straight part of the guide tube, the axis of the further straight part usually being normal to the distributor base. Once again, the measure allows the spatial position of the nozzle to be advantageously set.

An advantageous configuration of the distributor base according to the invention provides that the nozzle has a substantially cylindrical or conical nozzle opening. Both forms of nozzle are distinguished by a simple form and are consequently favorable to produce. In addition, these basic forms allow adaptation to the process conditions in the process chamber, so that the process gas jets can be set with regard to their form and turbulence, and consequently with regard to the jet penetration depth.

A special embodiment of the distributor base according to the invention provides that the nozzle consists of metal. Nozzles made of metal have been found to be low in cost and mechanically stable and have proven successful in operational tests. In addition, they can be worked well.

According to a further special embodiment of the distributor base according to the invention, the nozzle is connected to the distributor base or to the guide tube by means of a welded connection or by means of a flange. These simple mounting measures allow the distributor base to be equipped with nozzles at low cost and servicing or repair work to be easy.

The invention is described in more detail on the basis of the following figures, these figures only representing possible configurations of the distributor base according to the invention and not constituting any kind of restriction to these configurations.

DESCRIPTION OF PREFERRED EMBODIMENTS

Figure 1:
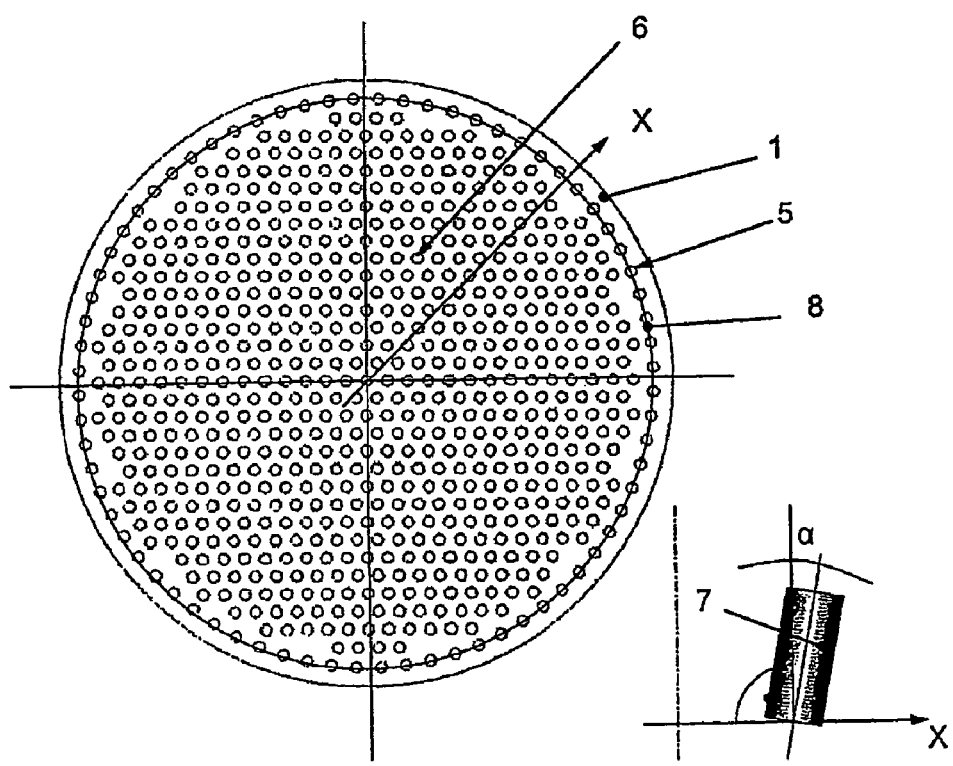
FIG. 1 shows the distributor base according to the invention schematically in plan view.

In FIG. 1, a distributor base 1 is represented in plan view. The openings 5, 6 and the installed nozzles and guide tubes in the distributor base are only schematically indicated by small circles. The reactor is of a circular form. The near-wall openings 5 are arranged here on a circle 8, so that the near-wall openings 5 are all at the same distance from the reactor wall. The near-wall openings may also be arranged in more than one circle 8, these circles respectively being arranged concentrically with respect to the center of the reactor. The openings 6 away from the wall may be arranged both in a different pattern and in a different number per unit area of the distributor base away from the wall. To optimize the flow, the arrangement of all the openings can be adapted to the reactor or the process.

FIG. 1 also shows the geometrical alignment of a near-wall, cylindrical nozzle 7, the direction X representing a radial line. The angle of inclination of the nozzle a can be adapted according to requirements.

Figure 2:
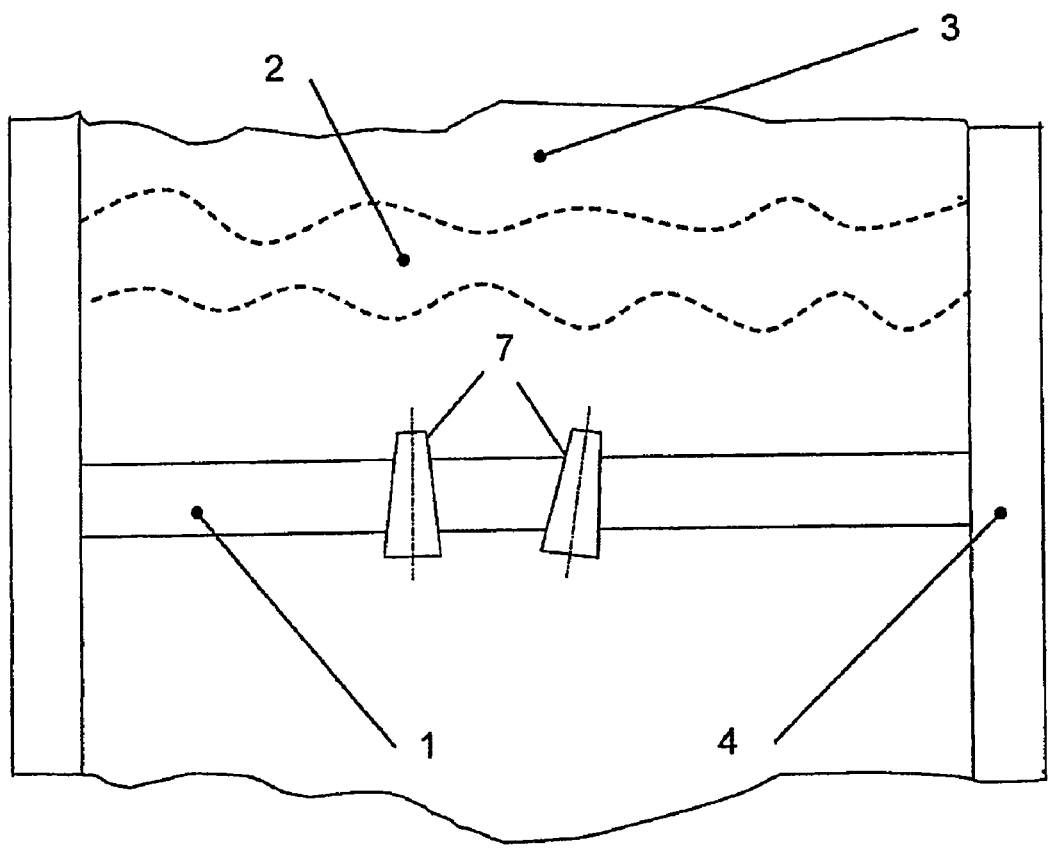
FIG. 2 shows the distributor base according to the invention, equipped with nozzles, in elevation in a reactor.

FIG. 2 shows the distributor base according to the invention, arranged in a reactor, in a sectional representation in elevation. The reactor is indicated by its reactor walls 4. Above the distributor base, at which nozzles are indicated, there is in the process chamber 3 and a fluidized bed 2. The way in which the distributor base 1 is configured according to the invention means that deposits on the distributor base 1 and on the reactor walls 4 can be avoided. The nozzles 7 can be inserted such that they are inclined with respect to the normal to the distributor base 1 or parallel to the normal to the distributor base 1. The arrangement according to the invention of the near-wall nozzles is advantageous, although they may also be directed toward the reactor wall 4, not being represented any more specifically in FIG. 2.

Figure 3:
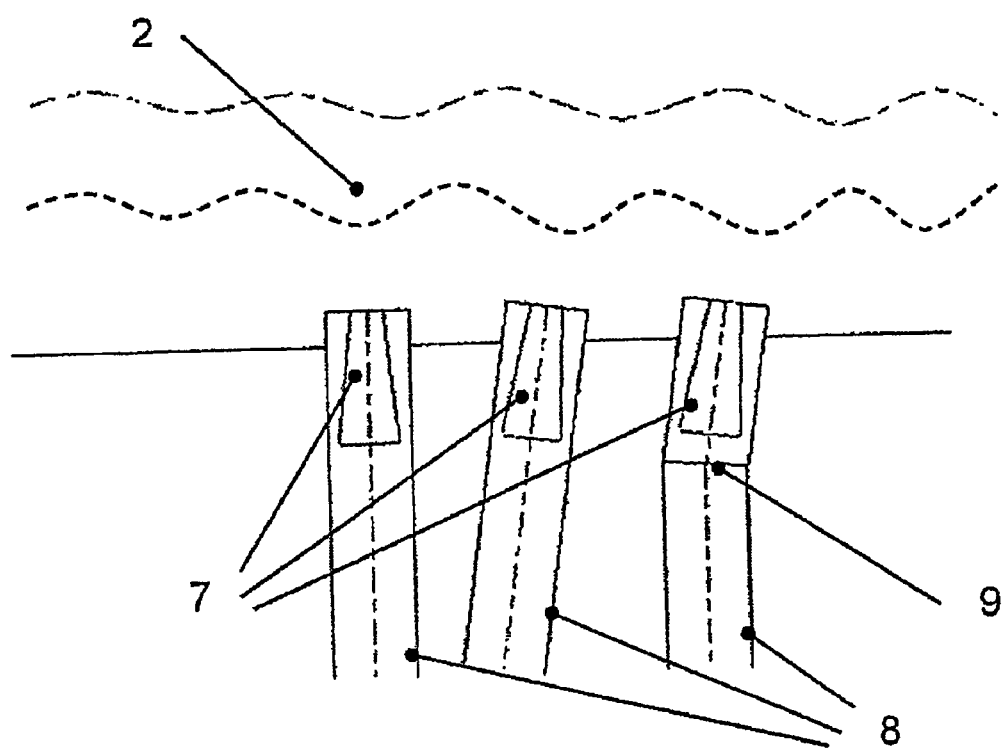
FIG. 3 shows the distributor base according to the invention, equipped with nozzles and guide tubes, in elevation in a reactor.

In FIG. 3, the nozzles 7 with the guide tubes 8 in the distributor base 1 are indicated. As a special embodiment, a guide tube with a bend 9 is indicated, allowing flow approaching the nozzle 7 and the direction of the process gas jet to be correspondingly adapted.

Figure 4:
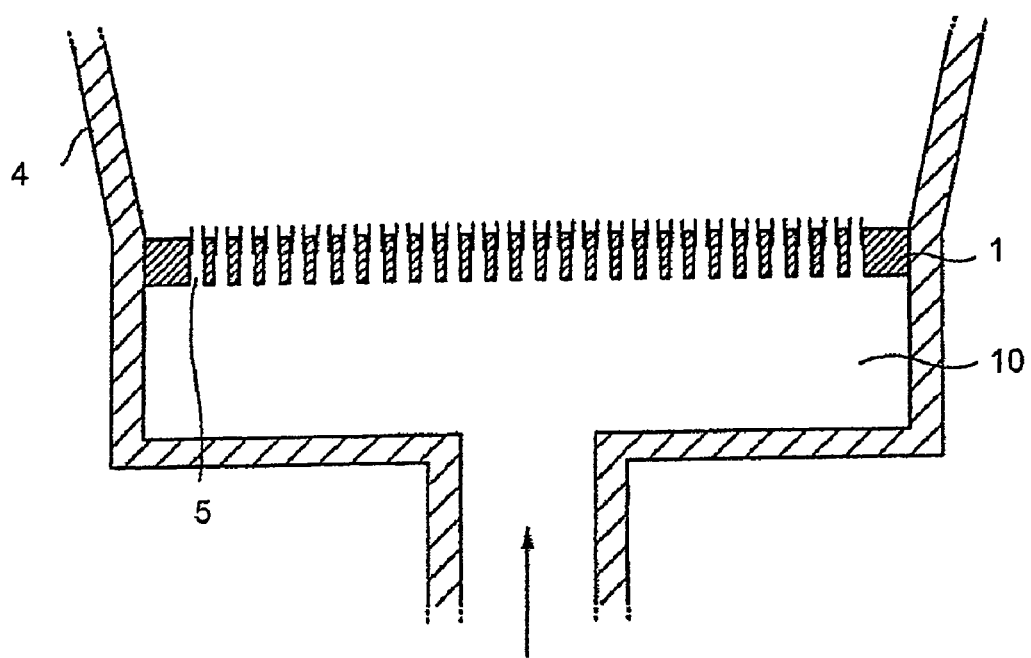
FIG. 4 shows an arrangement of the distributor base in a reactor.

In FIG. 4, the distributor base 1 with openings is arranged in a reactor 10, the reactor walls 4 over the distributor base being configured such that they are inclined in relation to the latter.

Figure 5:
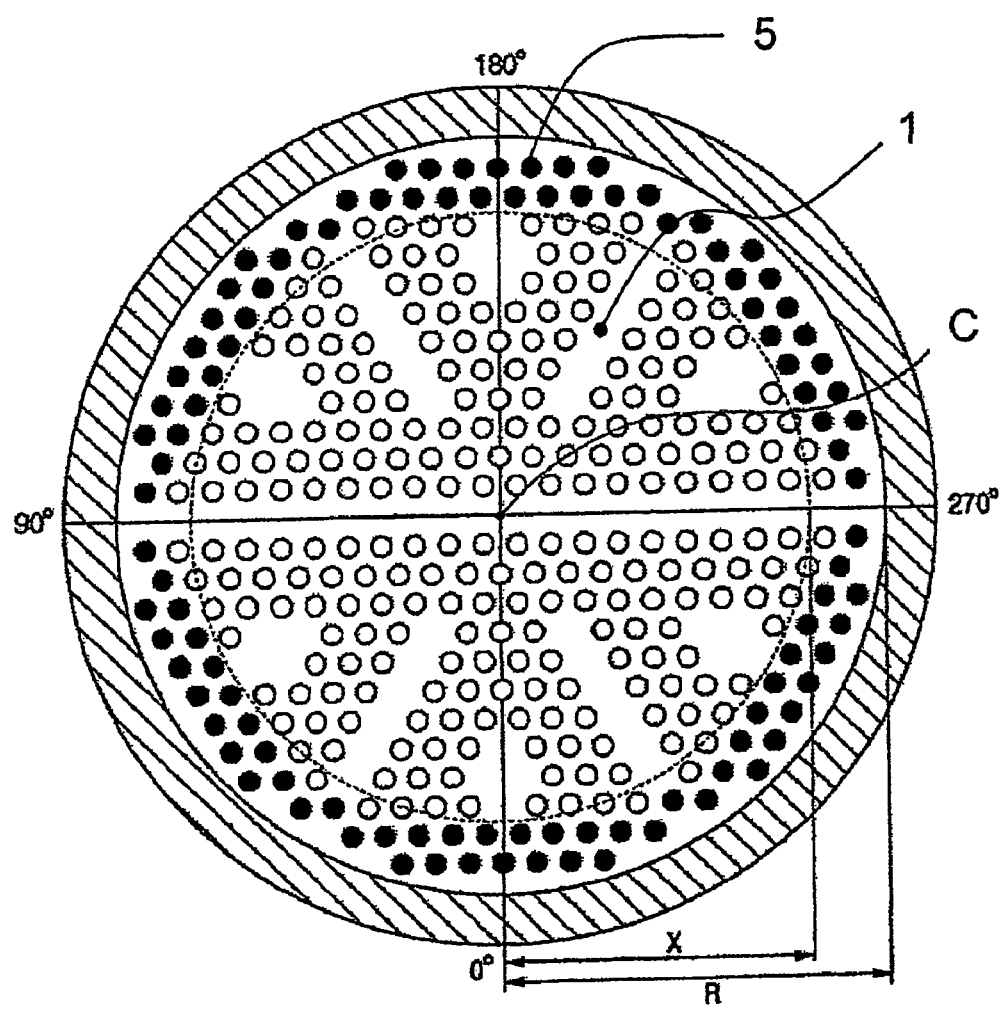
FIG. 5 shows the distributor base according to the invention in a special configuration.

In FIG. 5 there is a special configuration of the distributor base 1, the near-wall openings 5 being arranged in rows. The near-wall openings 5 are in this case arranged in a region with a radius greater than X and less than the reactor inside diameter R from the center axis C.

The invention claimed is:

1. A reactor for thermal metallurgical treatment of feedstock, the reactor comprising
a distributor base, a process chamber being arranged above the distributor base and including reactor walls of the reactor, the distributor base being operable for uniformly introducing process gas which is laden with solid particles to form a fluidized bed, in the process chamber,
wherein there is a multiplicity of openings in the distributor base, including near-wall openings arranged at a distance from the reactor walls such that a distance of the center axis of each near-wall opening from the portion of the reactor walls nearest to each near-wall opening is at most 1 to 10 times the diameter of the near-wall opening, or the ratio of the distance between the center axis of each near-wall opening and the center axis of the distributor base in relation to the radius of the distributor base is 0.9-1, and
wherein at least one of the near-wall openings forms an angle of greater than 0° and less than or equal to 15° or less than 0° and greater than or equal to −15° with a normal to the distributor base to introduce a targeted flow that is inclined with respect to a main direction of flow of the process gas.

2. The reactor as claimed in claim 1, wherein the near-wall openings in the base are arranged circularly in 1 to 5 circles.

3. The reactor as claimed in claim 1, wherein the near-wall openings are arranged in 1 to 5 rows parallel to an inner one of the reactor walls.

4. The reactor as claimed in claim 1, wherein at least one of the near-wall openings is arranged parallel with at least one of the reactor walls.

5. The reactor as claimed in claim 1, wherein the openings are at least partly arranged on circles, the openings on at least two of the circles being arranged offset in relation to one another in the circumferential direction, such that the openings of a circle that is next in an inward direction on the base are arranged between the openings of an outer one of the circles.

6. The reactor as claimed in claim 1, wherein a first quantity of near-wall openings per unit area at the edge region of the distributor base is greater than a second quantity of openings per unit area through the base located away from the reactor wall.

7. The reactor as claimed in claim 1, wherein the near-wall openings have a greater diameter, in relation to openings away from the wall, so that more process gas can be introduced in the near-wall regions.

8. The reactor as claimed in claim 1, wherein at least one of the near-wall openings is arranged parallel to one of the reactor walls.

9. The reactor as claimed in claim 1, wherein at least one of the near-wall openings is aligned in relation to one of the reactor walls such that the reactor wall is hit by a process gas jet formed at the opening when the process gas jet has traveled from the opening a calculated jet penetration depth.

10. The reactor as claimed in claim 1, wherein at least one of the near-wall openings is aligned in relation to one of the reactor walls such that the reactor wall is hit by a process gas jet formed at the opening when the process gas jet has traveled from the opening 70-130% of a calculated jet penetration depth.

11. The reactor as claimed in claim 1, wherein the near-wall openings are aligned differently than openings in the base away from the wall.

12. A reactor for thermal metallurgical treatment of feedstock, the reactor comprising
a distributor base, a process chamber being arranged above the distributor base and including reactor walls of the reactor, the distributor base being operable for uniformly introducing process gas which is laden with solid particles to form a fluidized bed, in the process chamber,
wherein there is a multiplicity of openings in the distributor base, including near-wall openings arranged at a distance from the reactor walls such that a distance of the center axis of each near-wall opening from the portion of the reactor walls nearest to each near-wall opening is at most 1 to 10 times the diameter of the near-wall opening, or the ratio of the distance between the center axis of each near-wall opening and the center axis of the distributor base in relation to the radius of the distributor base is 0.9-1,
wherein at least one of the near-wall openings forms an angle of ±15° with a normal to the distributor base, and
wherein at least one of the openings has a nozzle which can be set in its position.

13. The reactor as claimed in claim 12, wherein the nozzle which can be set in its position comprises a guide tube having an inside diameter of 1 to 10 times the smallest diameter of the nozzle.

14. The reactor as claimed in claim 13, wherein the length of the guide tube corresponds to at least 70% of the thickness of the distributor base.

15. The reactor as claimed in claim 13, wherein the guide tube is comprised of refractory material.

16. The reactor as claimed in claim 13, wherein the nozzle axis is inclined in relation to the axis of the guide tube and/or the opening in the distributor base.

17. The reactor as claimed in claim 13, wherein the guide tube has a bend.

18. The reactor as claimed in claim 12, wherein the nozzle has a substantially cylindrical or conical nozzle opening.

19. The reactor as claimed in claim 12, wherein the nozzle is comprised of metal.

20. The reactor as claimed in claim 12, wherein the nozzle is connected to the distributor base by a welded connection or by means of a flange.

21. The reactor as claimed in claim 1, wherein the distance of the center axis of each near-wall opening from the portion of the reactor walls nearest to each near-wall opening is two times the diameter of the near-wall opening.

22. The reactor as claimed in claim 1, wherein the near-wall openings are arranged in 2 rows parallel to an inner reactor wall.

23. The reactor as claimed in claim 1, wherein at least one of the near-wall openings forms an angle of ±5°, with a normal to the distributor base.

24. The reactor as claimed in claim 1, wherein the near-wall openings have a diameter greater by 10 to 50% in relation to openings away from the wall, so that more process gas can be introduced in the near-wall regions.

25. The reactor as claimed in claim 1, wherein the near-wall openings have a diameter greater by 20% in relation to openings away from the wall, so that more process gas can be introduced in the near-wall regions.

26. The reactor as claimed in claim 1, wherein at least one of the near-wall openings is arranged parallel to one of the reactor walls and/or is inclined at an angle of ±5°, in relation to a normal to the distributor base.

27. The reactor as claimed in claim 1, wherein at least one of the near-wall openings is aligned in relation to one of the reactor walls such that the reactor wall is hit by a process gas jet formed at the opening when the process gas jet has traveled from the opening 90-110% of a calculated jet penetration depth.

28. The reactor as claimed in claim 12, wherein the nozzle which can be set in its position comprises a guide tube having an inside diameter of 2 to 7 times the smallest diameter of the nozzle.

29. A reactor for thermal metallurgical treatment of feedstock, the reactor comprising
a distributor base, a process chamber being arranged above the distributor base and including reactor walls of the reactor, the distributor base being operable for uniformly introducing process gas which is laden with solid particles to form a fluidized bed, in the process chamber,
wherein there is a multiplicity of openings in the distributor base, including near-wall openings arranged at a distance from the reactor walls such that a distance of the center axis of each near-wall opening from the portion of the reactor walls nearest to each near-wall opening is at most 1 to 10 times the diameter of the near-wall opening, or the ratio of the distance between the center axis of each near-wall opening and the center axis of the distributor base in relation to the radius of the distributor base is 0.9-1, and
wherein at least one of the near-wall openings forms an angle of greater than 0° and less than or equal to 15° or less than 0° and greater than or equal to −15° with at least one of the reactor walls to introduce a targeted flow that is inclined with respect to the at least one of the reactor walls.

* * * * *